(12) United States Patent
Joguet et al.

(10) Patent No.: US 7,938,466 B2
(45) Date of Patent: May 10, 2011

(54) SUCTION GRIPPER DEVICE

(75) Inventors: Loïc Joguet, Guilherand-Granges (FR); Pierre Milhau, Charpey (FR); Michel Cecchin, Montelier (FR)

(73) Assignee: Coval, Montelier (FR)

( * ) Notice: Subject to any disclaimer, the term of this patent is extended or adjusted under 35 U.S.C. 154(b) by 0 days.

(21) Appl. No.: 12/433,577

(22) Filed: Apr. 30, 2009

(65) Prior Publication Data

US 2009/0273199 A1 Nov. 5, 2009

(30) Foreign Application Priority Data

Apr. 30, 2008 (FR) ...................................... 08 02425

(51) Int. Cl.
*B25J 15/06* (2006.01)
(52) U.S. Cl. ..................................................... 294/64.1
(58) Field of Classification Search ................. 294/64.1, 294/64.2, 64.3, 65; 417/185, 193
See application file for complete search history.

(56) References Cited

U.S. PATENT DOCUMENTS

| | | | | |
|---|---|---|---|---|
| 3,637,249 A | * | 1/1972 | Kuhl et al. | 294/64.1 |
| 3,702,698 A | * | 11/1972 | Schwebel | 294/64.1 |
| 4,266,905 A | * | 5/1981 | Birk et al. | 294/64.1 |
| 4,389,064 A | * | 6/1983 | Laverriere | 294/64.1 |
| 4,787,662 A | * | 11/1988 | Dewez | 294/64.1 |
| 5,110,239 A | * | 5/1992 | Riley et al. | 294/64.1 |
| 5,201,875 A | * | 4/1993 | Tessier et al. | 294/64.1 |
| 7,222,901 B2 | * | 5/2007 | Gebauer et al. | 294/64.1 |

FOREIGN PATENT DOCUMENTS

| EP | 1012101 | 6/2000 |
|---|---|---|
| WO | WO 90/11244 | * 10/1990 |

* cited by examiner

*Primary Examiner* — Paul T Chin
(74) *Attorney, Agent, or Firm* — Muncy, Geissler, Olds & Lowe, PLLC

(57) ABSTRACT

A suction gripper device comprising a pipe for connecting a suction source to a suction gripper member, the pipe comprising a first channel formed by a downstream chamber (5) and by an upstream duct (7), a seat (9) being provided between the chamber (5) and the duct (7), a valve member (6) being mounted to move with clearance inside the chamber (5) between a bottom abutment (2a, 22) and the seat (9), and a second channel (10) forming a calibrated bypass in parallel with the first channel and bypassing the seat (9), being of section that is smaller than the section (S) of the clearance that exists in the chamber (5) between its inside surface and the outside surface of the valve member (6) that can move therein, wherein the second channel (10) is formed through the center of the valve member (6).

4 Claims, 1 Drawing Sheet

SUCTION GRIPPER DEVICE

The present invention relates to a suction device (suction cup or box) for transporting articles, the articles for transporting adhering to the suction cup or box under the effect of suction created by sucking in air.

BACKGROUND OF THE INVENTION

A box presents a plurality of suction orifices, some of which act as gripping points only if they are covered by the article for handling. Unfortunately, numerous orifices are left uncovered by an article, and as a result the load on the vacuum generator is considerably increased.

With suction cups, this gripping function is not provided in the event of the suction cup failing or in the absence of an article beneath it.

In order to avoid those drawbacks, each suction duct or orifice is provided in conventional manner with a shutter or closure device that automatically interrupts the connection between the orifice and the suction box. More precisely, in a box, it is known to provide a chamber in the box wall and to place within the chamber a valve, e.g. having a moving member in the form of a ball, which valve member is free to move within certain limits. The chamber is made to be large enough so that, during normal operation, the vacuum created in the orifice over an underlying article does not raise the ball. If no article is present in register with the orifice, air is sucked in and the flow through the chamber is sufficient to entrain the ball and lift it to the valve seat via which the chamber is connected to the inside volume of the box, so as to press the ball in leaktight manner against its orifice, thereby taking the orifice out of service. For this purpose, it is appropriate for the stroke that is available to the ball, for the weight of the ball, and for the dimensions of the orifice to be determined appropriately relative to one another.

It is also necessary to make provision for this isolation of the orifice from the atmosphere to cease when a part becomes present in register with the orifice that had previously been taken out of action by the valve ball. For this purpose, an air channel of calibrated section is provided in parallel with the valve chamber. Thus, in the presence of an object that closes off the orifice in leaktight manner together with the surrounding zone into which the calibrated duct opens out, it is possible to cause the pressure in said leaktight space to drop and thus to lower the pressure in the chamber upstream from the valve member. When the pressure becomes low enough, the ball separates from its seat and a larger section is thus opened for suction. This improves taking hold of the article and retention thereof.

Document EP 1 012 101 describes a device of the above type. The machining required to fabricate it is expensive since it requires two parallel channels to be provided, one of which is of an extremely precise diameter so that the permanent leak it establishes between the vacuum source and the atmosphere is under control and does not overload the vacuum generator.

OBJECT OF THE INVENTION

The invention seeks to propose an alternative solution to the above architecture, which alternative is much less expensive than the known technology.

BRIEF DESCRIPTION OF THE INVENTION

To this end, the invention thus provides a suction gripper device comprising a pipe for connecting a suction source to a suction gripper member, the pipe comprising a first channel formed by a downstream chamber and by an upstream duct, a seat being provided between the chamber and the duct, a valve member being mounted to move with clearance inside the chamber between a bottom abutment and the seat, and a second channel forming a calibrated bypass in parallel with the first channel and bypassing the seat, being of section that is smaller than the section of the clearance that exists in the chamber between its inside surface and the outside surface of the valve member that can move therein, wherein the second channel is formed through the center of the valve member.

Thus, unlike prior devices, there is no need to make the calibrated bypass separately by machining or by some other fabrication technique: it suffices to pierce a calibrated hole through the valve member through a few tenths of a millimeter of material forming the top of the valve member.

The valve member is preferably in the form of a bell having a cylindrical skirt having an outside surface that includes facets, for example, and an end wall facing towards the seat and pierced in its center.

When the gripper member is a box within which suction is sustained, the box being defined by a substantially plane bottom wall fitted on its outside face with an airtight elastic lining, the wall is provided with a plurality of orifices, each made up as described above, the bottom abutment for the valve member being formed by a portion of the lining that overlaps the outlet from the first channel into the outside face of the bottom wall of the box.

Other characteristics and advantages of the invention appear from the following description of an embodiment given by way of example.

BRIEF DESCRIPTION OF THE DRAWING

Reference is made to the accompanying drawing, in which.

DETAILED DESCRIPTION OF THE INVENTION

Figure 1:
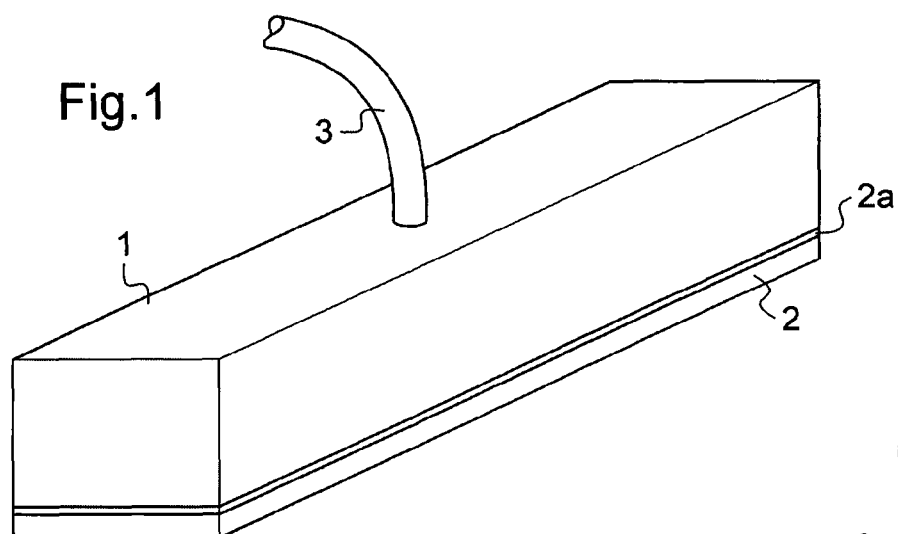
FIG. 1 is a diagrammatic view of a vacuum handling box in accordance with the invention.
Figure 2:
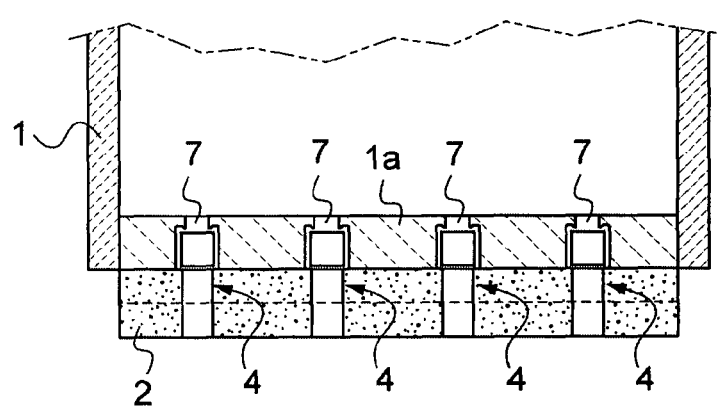
FIG. 2 is a view of the FIG. 1 box in cross section through its bottom wall.
Figure 3:
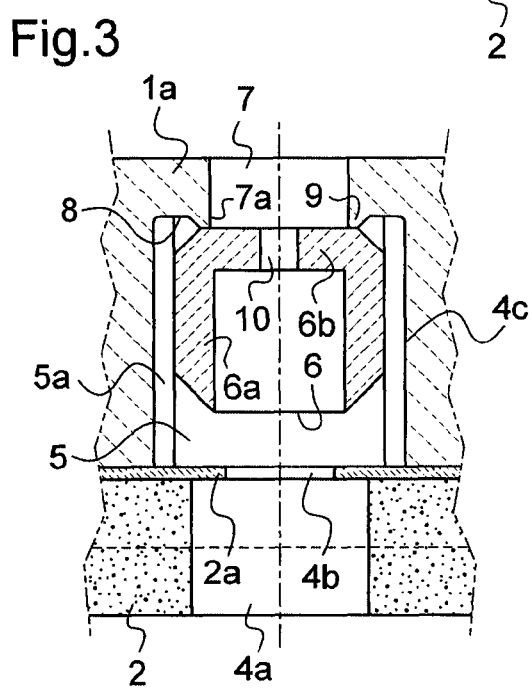
FIG. 3 is a detail view of a suction orifice in accordance with the invention.

In FIGS. 1 to 3, the box of the invention is in the form of a rectangular parallelepiped 1 having a bottom face provided with an airtight flexible lining, a firm foam 2 with semi-closed cells, for example, mounted on a rigid support plate 2a, the inside of the box being connected to a vacuum source or generator (not shown) by a duct 3, while the bottom wall and the lining are pierced by a plurality of holes or passages 4. The box is designed to be carried by a support structure (not shown) on which there may be mounted a plurality of boxes in parallel, which structure is fastened to the end of a manipulator arm or a gantry crane of a handling installation controlled by computer or by a programmed controller.

Handling operations consist in bringing the support structure with the boxes into contact with parts that are to be moved, the parts being in the form of a bed or a layer of parts, e.g. at the top of a palletized load. The lining is flattened in contact with the parts and the volume existing between the opening of each orifice and the top surface of the part that flattens the lining at this location becomes a suction chamber acting like a suction cup. Parts gripped in this way can be lifted and moved by the manipulator arm that supports the set of boxes.

Each orifice or passage 4 (which in this embodiment forms the above-mentioned pipe) comprises a first portion of first section 4a passing through the lining, an orifice 4b that is formed in the plate 2a that supports the lining 2, and a section 4c that is formed through the thickness of the bottom wall 1a of the box. The section 4c constitutes a low chamber 5 that receives a valve member 6 with clearance. The diameter of the orifice 4b is less than the diameter of the chamber 5 such that the plate 2a beside the orifice 4b forms an abutment for retaining the valve member 6 within the chamber 5. A second portion of the orifice 4 is a top channel 7 that is narrower than the chamber 5 such that between them there is a shoulder 8 formed around the outlet 7a from the top channel into the chamber 5 so as to constitute a seat 9 against which the valve member 6 can bear.

The valve member 6 is in the form of a bell with a cylindrical skirt 6a of outside diameter smaller than the diameter of the chamber 5. In a preferred variant of the valve member, the skirt 6a has facets on its outside face such that guidance is provided by the edges of the facets and the clearance present between the facets and the surface of the chamber 5. The flow section in the chamber around the valve member is referenced S. If the outside surface of the valve member is cylindrical, ribs 5a may be provided in the chamber 5 to guide the valve member as it slides in the chamber 5. The bell possesses an end wall 6b facing towards the seat 9 and pierced by a calibrated orifice 10 of section that is much smaller than the above-mentioned flow section S between the valve member and the chamber. The calibrated orifice constitutes a permanent bypass in parallel with the passage 4 so as to go round the seat 9.

Naturally, as in the prior art, the weight of the valve member is selected in such that a manner that if the orifice is not covered by an article to be grasped, the flow of air sucked in from the atmosphere is sufficient to cause the valve member 6 to rise in the chamber 5 and to hold it pressed against the seat 9. The air flow passing through the calibrated orifice 10 is small enough to avoid putting too great a load on the vacuum source. Nevertheless, this flow serves, when the valve member presses against its seat and an article is present in front of the orifice 4, to purge progressively the leaktight space thus constituted upstream from the seat 9 in such a manner that pressure equilibrium on either side of the valve member is achieved and the valve member leaves its seat. Maximum suction is then sustained in the orifice 4.

The gripper may be adapted to the porosity of the material from which the articles for handling are made by modifying the weight of the valve member and the leakage diameter defined by the calibrated orifice 10, for example by putting on sale various sets of valve members for use with different materials that the gripper needs to handle.

The pierced valve member is of a cost price that is much smaller than any previously known embodiment. In addition, maintenance of the device is greatly simplified since any blocking of the calibrated orifice is very simple to remedy. At worst, interchanging valve members enables action to be taken quickly to correct a fault in the device, and the valve member can be unplugged subsequently outside the device.

Figure 4:
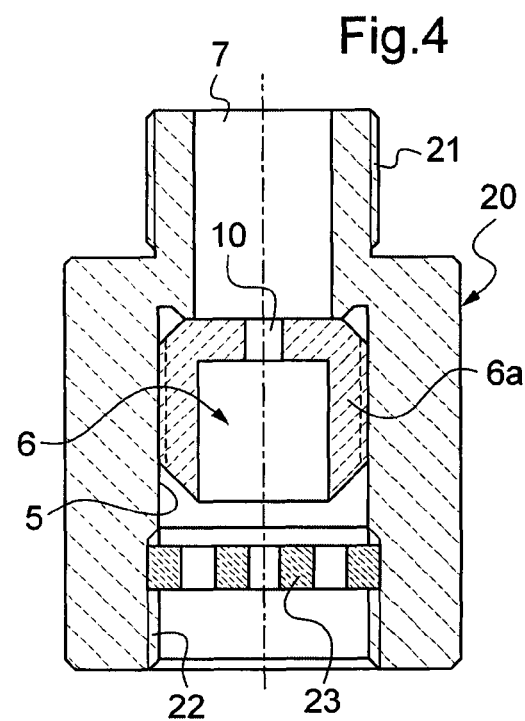
FIG. 4 is a section view of a variant embodiment of the invention, for putting into place in a passage connecting a suction source to a suction grip member.

In FIG. 4, there is shown an isolated leakage valve member comprising a body 20 fitted with means (thread 21) enabling it to be connected to the upstream segment of an outside pipe forming a connection between said body and a vacuum source (not shown), and means (e.g. a thread 22) for connecting the body 20 to a downstream segment of said pipe for connecting it to a suction gripper member such as a suction cup. Inside the body 20 there is the chamber 5, the valve member 6, the channel 7, and the seat 9, together with an internal abutment (grid) 23 that is provided to keep the valve member 6 inside the chamber 5.

What is claimed is:

1. A suction gripper device comprising a pipe for connecting a suction source to a suction gripper member, the pipe comprising a first channel formed by a downstream chamber (5) and by an upstream duct (7), a seat (9) being provided between the chamber (5) and the duct (7), a valve member (6) being mounted to move with clearance inside the chamber (5) between a bottom abutment (2a, 22) and the seat (9), and a second channel (10) forming a calibrated bypass in parallel with the first channel and bypassing the seat (9), being of section that is smaller than the section (S) of the clearance that exists in the chamber (5) between its inside surface and the outside surface of the valve member (6) that can move therein, wherein the second channel (10) is formed through the center of the valve member (6).

2. A suction gripper device according to claim 1, wherein the valve member (6) is in the form of a bell having a cylindrical skirt (6a) and an end wall (6b) that is pierced in its center and that faces towards the seat (9).

3. A suction gripper device according to claim 2, wherein the cylindrical skirt possesses an outside surface with facets.

4. A suction gripper device according to claim 1, comprising a box (1), within which suction is sustained, the box being defined by a substantially plane bottom wall (1a) fitted on its outside face with an elastically compressible lining (2, 2a) and that is airtight, the wall being provided with a plurality of passages (4) each forming a pipe in the meaning of claim 1, wherein the bottom abutment for the valve member (6) is formed by a portion of the lining (2, 2a), overlapping the outlet of the first channel (4b) into the outside face of the bottom wall (1a) of the box (1).

* * * * *